Jan. 3, 1939. F. VON GRAF ET AL 2,142,465
SELF-CENTERING RADIUS GAUGE
Filed July 24, 1936 2 Sheets-Sheet 1

INVENTORS
Frederick Von Graf
Wilhelmina Von Graf

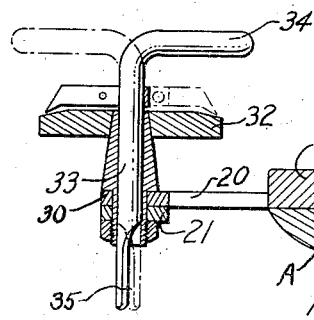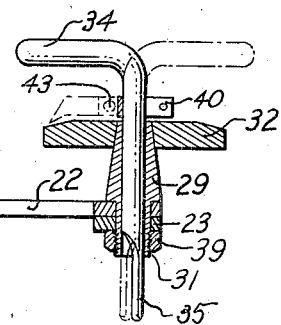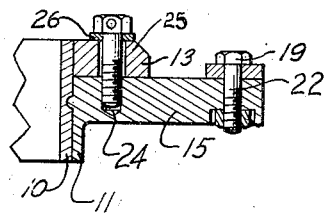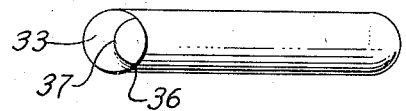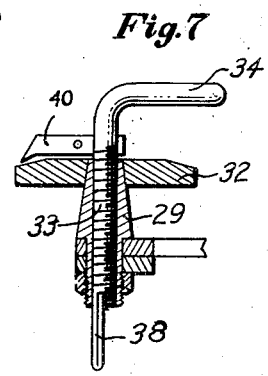

Patented Jan. 3, 1939

2,142,465

UNITED STATES PATENT OFFICE 2,142,465

SELF-CENTERING RADIUS GAUGE

Frederick Von Graf and Wilhelmina Von Graf, Los Angeles, Calif.; said Frederick Von Graf assignor to said Wilhelmina Von Graf Application July 24, 1936, Serial No. 92,418

5 Claims. (Cl. 33—178)

This invention relates to self centering measuring devices, and more particularly to gauges, and chucks.

The primary purpose of this invention is to provide a simple and inexpensive radius transfer gauge for taking measurements of objects of a preferably cylindrical nature upon both inside and outside diameters for finding their common diameter.

A further object of the present invention is to provide a measuring radius transfer gauge provided with diametrically opposite gauge pins which are arranged to be linearly adjustable towards and from each other.

A still further object of this invention is to provide, in a device of the class described, a novel gauge pin so shaped and constructed and designed as to present its marking end and surfaces in positions in its holder where same may contact equally well and accurately with the inner or outer circumference of the body to be measured for finding a diameter common to both circumferences.

A further purpose of this invention is to provide means whereby when one gauge pin is shifted adjustably about a centering device another and linearly opposite gauge pin is automatically moved the same direction and distance to thereby locate both pins where same may contact the circumference of the body to be measured when the gauge is transferred to this body for this purpose.

A further object of this invention is to provide a self centering radius transfer gauge for centering cylindrical bodies by means of their inner or outer edges, said gauge being characterized by the fact that it can be easily and conveniently operated, displaced selectively and held in a fixed position after being set to size.

A still further object of the present invention is to provide for simultaneously adjusting both gauge pins of the device whereby to bring about an accurate quick adjustment of these members upon a centering member.

A final object of this invention is to provide a pair of oppositely arranged pin carriers upon a centering device in such a manner that the gauge pins or gauge pins located in the carriers may be rotatably adjusted therein not only for the purpose of assuming a position where their working ends will be set to the proper outside measurement of a cylindrical body being worked upon when the device is transferred to this body, but where the degree of rotation of the pin in its holder is visually indicated as well. Means is provided for visually indicating the linear separated distance of the two gauge pins after they have been locked in set or adjusted position. In a similar manner the two gauge pins may be set and adjusted in their holders for the purpose of being transferred for contact with the inside surface desired to be measured.

With the above and other objects in view our invention consists in the combination, arrangement and details disclosed herein and then more particularly pointed out in the appended claims.

In the drawings, wherein similar reference numerals designate similar parts throughout the respective views, Figure 1 is a top plan view of our invention the dotted lines indicating qualified positions of the scribes, Figure 2 is a bottom plan view thereof, Figure 3 is a longitudinal sectional elevation thereof.

Figure 4 is a detailed sectional view of the means for locking the adjustable parts together.

Figure 5 is a bottom plan view of the gauge pins or scribes, one being shown.

Figure 6 is a plan view, in modification, of the invention, and

Figure 7 is a sectional elevation of a threaded scribe or gauge pin with its associated parts.

Figure 1:
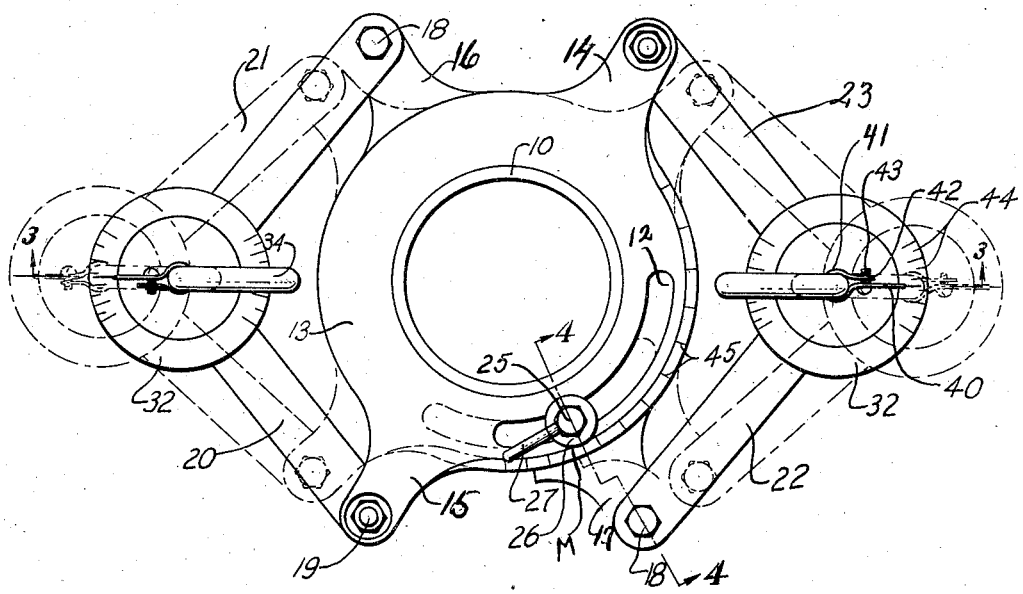
Figure 2:
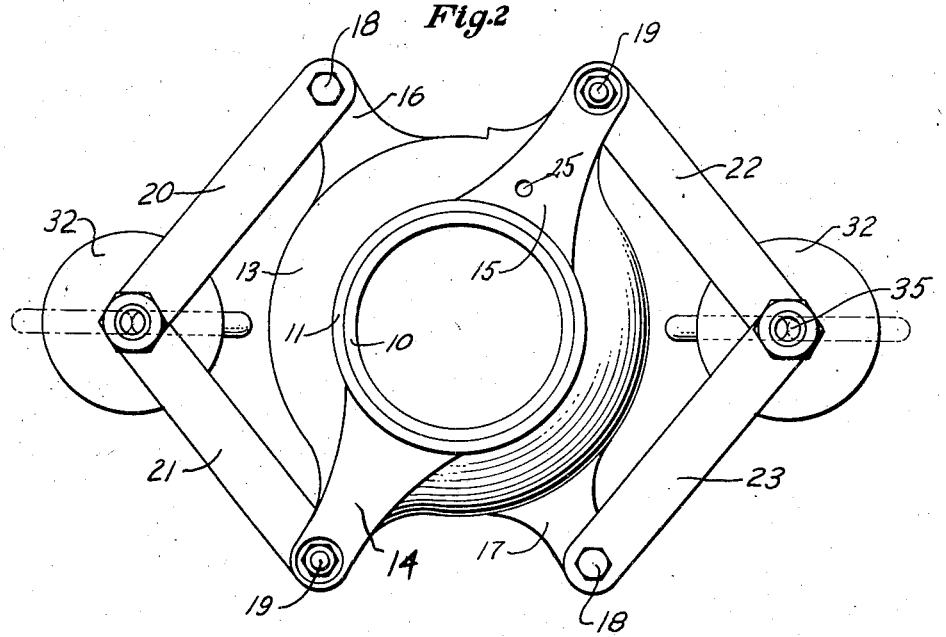

In the drawings, which are merely illustrative of our invention the various parts of our invention are shown.

Upon a preferably cylindrical centering collar 10 is mounted for rotation a swivel ring 11 having an internal rib A nested for rotation within a corresponding annular seat formed in the collar 10. The collar carries a base 13 upon which is formed an arcuate slot 12. The swivel ring carries or is formed with a pair of diametrically opposed ears, or lugs or arms, 14, 15 respectively, while the centering collar carries the diametrically opposite arms 16, 17 respectively.

Pivot pins 18 pass operatively through the arms 16, 17, while pivot pins pass through the arms 14, 15 which are designated 19. A pair of adjacent radius links 20, 21 respectively engage pivot pins 18, 19 on one side of the device. It will be seen from Figure 4 that the pins 19 are screw threaded bolts which screw home upon nuts imbedded in countersunk relation in the particular arm 14 or 15. Another pair of radius links are connected by means of the pivot pins or bolts 18, 19 at the other side of the device, these links being designated 22, 23. One of the arms 15 is formed with a threaded socket or bore 24 into which is screwed home the threaded terminal of a screw bolt 25 upon whose head 26 is formed an operating crank handle 27. When the swivel ring 11 turns relatively to the centering collar with its arms 14, 15, the bolt 25 having first been loosened in its hold upon the collar, it will be seen that this bolt is carried around in its cycle by projecting through the arcuate slot 12 in the collar. The bolt may then be tightened for the purpose of clamping the ring upon the collar in set or adjusted position.

Each pair of links, 20, 21, or 22, 23 have their outer ends arranged to overlap and they are here provided with registering holes into which projects the unthreaded parts 30 of conical ferrules 29 whose bases rest upon the links 20, 21, 22, 23 respectively. The countersunk nuts 28 which are located in the arms 14, 15 confine the pivot bolts 19 effectively to permit the radius links involved to open or close for scribe adjusting purposes about to be described.

Lock nuts 39 screw home upon the lower threaded terminals of the ferrules 29 to hold the latter against displacement from the mentioned arms and these nuts engage the connecting links where they overlap endwise. There is a shelf 32 having a conical bore which allows the pointed end of each ferrule to project there-into to thereby properly seat the shelf upon the ferrule flush with the outer surface of the ferrule, in which position the shelf is parallel with the arms.

We provide a specially constructed gauge pin 33 which is formed at one end with an integral crank 34 and which has a reduced terminal or shank 35 which, in cross-section is equal to one half the diameter of the cylindrical scribe itself; it will be noticed that along a median line of the gauge pin this shank is formed longitudinally with arched surface 36 whose center line or crest is designated 37 being located exactly upon the center of the gauge pin 33. This arched shank is disposed parallel with the gauge pin itself.

The shelf 32 is inscribed with an annular series of calibrations forming a vernier 44. To point out any of these calibrations for measuring purposes we secure upon the gauge pin an indicator arm 40 made from a strip of sheet metal as follows: this strip is bent upon itself to provide a loop 41 which is slipped onto gauge pin 33 proper and its integral lug 42 overlies the main body of the strip at which point a set screw or fastener 43 passes into the overlapping parts to clamp the loop frictionally about this gauge pin. With the indicator thus secured it engages edgewise upon the shelf to stop after the scribe or gauge pin has been given any desired adjustment. This adjustment may be rendered necessary to compensate for variations in infinitesimal degrees found to exist after the gauge pin, once set in position upon the gauge, has been transferred to the body to be measured. We also provide an arcuate series of calibrations 45 upon the base 13 of the collar 10 with which co-operates the calibration or mark M inscribed upon arm 17 (Figure 1) for as this arm moves this mark moves too relatively to the calibrations 45.

Now it is proposed to accurately fit the self centering radius gauge in operation, into a cylindrical body whose inner circumference must be equal to the outer circumference of another cylindrical body. It may be seen that should the contacting inner circumference and outer circumference of the bodies to be measured not be equal to each other, the present invention will instantly reveal the fact, by means of the scribes 33.

The vernier at 45 provides a means whereby the present gauge may be adjusted to exact given diameters and also to provide, if necessary, for re-adjustments.

The gauge pins, once set and adjusted in their holders or ferrules will either contact the external surface of the stock to be measured or the internal surface of the body as the case may be; the high point being its arched surface 37 will allow clearance for the single point of contact formed at the exact axis of cylindrical shank 33 to accurately gauge internal or external surfaces of opposed annular bodies that have to be interfitted interchangeably.

Our discovery of a single, exact axial point utilizable as a gauging means brings about a new gauging element where by a single point of gauged contact is constantly maintained at an exact and unchanging position. Therefore the particular shape of the reduced portion 35 of the scribe 33 adapts it to be disposed in either of opposing directions, the high point of the arch 37 remaining at all times disposed at the exact axis of the cylindrical scribe 33. We do not mean to limit ourselves herein to the exact details of construction.

What we desire to claim and secure by Letters Patent is:—

1. In a device as described a gauge pin carrier, a conical ferrule having a reduced shank removably fitted into said carrier and terminating in a threaded portion projecting below the carrier, a lock nut engaging said threaded portion and said carrier to confine the ferrule, a gauge pin frictionally and rotatably mounted in said ferrule and having an operating crank, a shelf removably seated upon said ferrule flush with the upper surface thereof and being inscribed with an annular series of calibrations, and a pointer on said gauge pin designed to move across said shelf as the gauge pin turns to point out any of said calibrations.

2. A gauging device, as described, consisting of a centering collar, a swivel ring mounted for rotation thereon, means holding both collar and ring against displacement, a pair of diametrically opposite cranks carried by said collar and ring respectively, two pairs of links each pivoted collectively to two contiguous cranks carried by collar and ring respectively, the free ends of each pair of pivoted links being surmounted and having registering openings, ferrules held in secured relation in each pair of registering openings and acting as pivots for said links and handles having shanks positioned revolubly in both ferrules by means of which linear movement of either ferrule and consequent operation of the links and cranks associated therewith automatically causes linear movement of the opposite ferrule with its links and collars in the same direction towards or from centering collar indicated by the first ferrule, the lower part of each shank projectable beyond the adjacent end of the ferrule and being there formed with reduced straight stems whose greatest thickness is concentric with said shank and equal to its radius.

3. In combination, a centering collar, a swivel ring associated thereabout revolubly, a lazy tongs extending at diametrically opposite points and connected to both collar and ring, each lazy tongs having outer converging links, a ferrule pivoting together the links of each lazy tongs, said lazy tongs being so disposed that operation of one of them automatically operates the other so both ferrules may move toward or from each other, shanks frictionally rotatable in said ferrules and having terminals reduced linearly to form a gauging edge located at the exact center of the shank, and crank handles on the opposite ends of said shanks by means of which gauging shanks as well as said lazy tongs may be actuated.

4. As a new article of manufacture a centering collar, a pair of gauge pin carriers arranged diametrically of said collar, means carried by said collar for enabling said carriers to be advanced towards or from each other relatively to said collar, unitary means for locking both carriers in set postion, ferrules carried by said carriers, and gauge pins snugly movable longitudinally and rotatively in said ferrules, having at one end reduced linear gauge edges located at the exact center of the pins and at the other end having right angular handles whereby to initiate the movement of the carriers as well as of the gauge pins.

5. As a new article of manufacture a centering collar, a swivel ring nested thereto concentrically, a pair of gauge-pin carriers arranged diametrically of said collar, ferrules supported upon the outer parts of said carriers, gauge pins operable in said ferrules and having crank-shaped operating handles, means for reciprocating either carrier with relation to the collar and thereby swivel said swivel ring, means whereby as said ring swivels it causes the other carrier to reciprocate in unison with the first carrier, said ring having a graduated arcuate slot and a bolt projecting into said slot and threaded into said collar and having a head frictionally pressing the ring and collar together so as to lock both carriers in adjusted position, showing correct measurement.

FREDERICK VON GRAF.
WILHELMINA VON GRAF.